(12) United States Patent
Arzuaga et al.

(10) Patent No.: US 10,717,932 B2
(45) Date of Patent: Jul. 21, 2020

(54) NON-METALLIC BELT-DRIVEN CROSSHEAD DRIVE SYSTEM FOR HYDRAULIC DECOKING

(71) Applicant: Flowserve Management Company, Irving, TX (US)

(72) Inventors: Daniel O. Arzuaga, Hermosa Beach, CA (US); Hrishikesh Raghunath Gadre, Long Beach, CA (US)

(73) Assignee: Flowserve Management Company, Irving, TX (US)

( * ) Notice: Subject to any disclaimer, the term of this patent is extended or adjusted under 35 U.S.C. 154(b) by 407 days.

(21) Appl. No.: 15/516,508

(22) PCT Filed: Sep. 30, 2015

(86) PCT No.: PCT/US2015/053077
§ 371 (c)(1),
(2) Date: Apr. 3, 2017

(87) PCT Pub. No.: WO2016/054131
PCT Pub. Date: Apr. 7, 2016

(65) Prior Publication Data
US 2017/0247616 A1    Aug. 31, 2017

Related U.S. Application Data

(60) Provisional application No. 62/059,406, filed on Oct. 3, 2014.

(51) Int. Cl.
*C10B 33/00* (2006.01)
*F16G 1/28* (2006.01)
(Continued)

(52) U.S. Cl.
CPC .......... *C10B 33/006* (2013.01); *B08B 9/0813* (2013.01); *F16G 1/10* (2013.01);
(Continued)

(58) Field of Classification Search
None
See application file for complete search history.

(56) References Cited

U.S. PATENT DOCUMENTS 1,031,106 A    7/1912   Camp
1,828,136 A    10/1931  Freedlander
(Continued)

FOREIGN PATENT DOCUMENTS

FR    2699845 A1    7/1994

OTHER PUBLICATIONS

International Search Report and Written Opinion dated Dec. 28, 2015 for PCT/US2015/53077 Filed Sep. 30, 2015. pp. 1-10.
(Continued)

*Primary Examiner* — Nicole Blan
(74) *Attorney, Agent, or Firm* — Dinsmore & Shohl, LLP

(57) ABSTRACT

An apparatus for raising and lowering a cutting tool within a decoking drum, a decoking system and a method of raising and lowering a decoking system cutting tool. Instead of using metallic ropes, chains, or a self-propelled gear-based approach, non-metallic belts are secured at respective ends to a crosshead and one or more counterweights to enable vertical movement of the crosshead that in turn permits vertical movement of the cutting tool throughout the height of the drum. A motorized pulley system controls the movement of the belt, and preferably avoids having the motor be carried by the crosshead. The belts on each pulley are preferably arranged as cooperative sets so that within each set, both primary load belts and secondary load belts are present. Enhanced engagement between at least the primary load belts and the pulleys promotes greater load-bearing capability, while the secondary load belts are sufficiently (Continued)

strong to ensure positional stability of the crosshead and decoking tool upon damage to or failure of one or more of the primary load belts.

14 Claims, 6 Drawing Sheets

(51) Int. Cl.
*F16G 1/10* (2006.01)
*B08B 9/08* (2006.01)
*F16H 19/00* (2006.01)
*F16H 55/17* (2006.01)
*B08B 9/093* (2006.01)

(52) U.S. Cl.
CPC ............ *F16G 1/28* (2013.01); *F16H 19/003* (2013.01); *F16H 55/171* (2013.01); *B08B 9/093* (2013.01)

(56) References Cited

U.S. PATENT DOCUMENTS

| | | |
|---|---|---|
| 2,427,172 A | 9/1943 | Williams |
| 5,129,865 A | 7/1992 | Brock et al. |
| 5,807,194 A | 9/1998 | Knutson et al. |
| 6,050,277 A | 4/2000 | Purton et al. |
| 2004/0206579 A1* | 10/2004 | Baranda ............... B66B 7/06 187/254 |
| 2006/0196731 A1* | 9/2006 | Honda ............... B66B 7/06 187/266 |

OTHER PUBLICATIONS

International Preliminary Report on Patentability dated Apr. 4, 2017 for PCT/US2015/53077 Filed Sep. 30, 2015. pp. 1-9.
"Poly Chain GT Carbon Belts", Synchronous Belts http://www.gates.com/products/industrial/industrial-belts/synchronous-belts/poly-chain-gt-carbon-belts Accessed/Published: Mar. 2014.

* cited by examiner

NON-METALLIC BELT-DRIVEN CROSSHEAD DRIVE SYSTEM FOR HYDRAULIC DECOKING

CROSS-REFERENCE TO RELATED APPLICATIONS

This application claims the benefit of U.S. Provisional Application Ser. No. 62/059,406 filed Oct. 3, 2014.

BACKGROUND OF THE INVENTION

This invention relates generally to devices for carrying a cutting and drilling tool and other components for use in delayed coking reactor operation, and more particularly to the use of non-metallic belts that provide a fail-safe lifting design for raising and lowering such components.

In conventional petroleum refining operations, crude oil is processed into gasoline, diesel fuel, kerosene, lubricants or other useful materials through distillation or related means. In such an operation, the crude oil (which is typically subjected to various upstream processing or production steps at or near the well from which the oil is extracted) is heated to elevated temperatures in a fractional distillation unit in order to selectively release—depending on differing boiling points—the valuable volatile hydrocarbon components contained therein. The heavy remaining oils are drained from the fractionation unit, heated, and transferred into vessels (known as coke drums) at a temperature (specifically, a thermal cracking temperature) sufficient to drive off the remaining volatile materials to leave the drums full of solid coke. Because large-scale refineries can produce as much as 2,000 to 3,000 tons per day of solidified coke, the drums—which are as large as 30 feet in diameter and 140 feet in height—must be frequently cleared to make room for the next incoming batch.

One method of breaking up the coke residue is by using a decoking (or coke cutting) tool in conjunction with a decoking fluid, such as high pressure water. The tool (which is typically secured to a tower that is in turn mounted onto a support structure that surrounds the coke drum) is lowered into the coke drum through an opening in its top, and the high pressure water supply is introduced into the tool so that it can be selectively routed through—depending on the mode of operation—either the drilling or cutting nozzles of the tool to impinge on the coke in the drum and act as a coke-breaking fluid jet. Such tools require high flow rates and pressures (for example, flows of 1000 gallons per minute (gpm) at 3000 to 4000 pounds per square inch (psi) or more). Moreover, the tower, tool and its ancillary equipment (including among others drill stems, drive mechanisms, water-filled hoses or related conduit, collectively referred to as a cutting train that can be supported by a crosshead) can be extremely heavy, weighing (depending on the size and configuration) up to 15,000 pounds or more. A steel cable operated by a winch is used to raise or lower the cutting train. In addition, separate fall arresting gear is required in numerous decoking tool crosshead designs to prevent a freefall in the event of a cable break or a winch failure within the tower; such redundancy adds significantly to the maintenance and operation complexity, as well as the weight and cost of the decoking system without contributing to the efficiency of the actual decoking process.

To avoid having complex support structures for movement of the water jet cutting head and related equipment through the vertical entirety of the coke drums, a self-climbing crosshead-based lifting configuration may be employed, an example of which is depicted in U.S. Pat. No. 6,050,277 (the '277 patent) that is owned by the Assignee of the present invention and incorporated herein by reference in its entirety; such a configuration forms a crosshead drive system. An additional way that redundancy and complexity is avoided in the '277 patent is through the use of rollable carriages (such as those depicted in FIG. 3B thereof) on a track or rail so that a single tower (rather than multiple towers) that is used to support the cutting train can be transported between adjacent drums.

Despite the improvements made by such a configuration, difficulties remain. For example, the long lengths of the rack-and-pinion configuration must still rely upon rigid support by a vertical member that—while not as cumbersome as a complete tower—must be robust enough to ensure that precise engagement of their meshing gear teeth of the self-propelled drive system is maintained, as misregistration between them can lead to faulty (or no) crosshead movement; such rigidity can exact significant weight, cost and complexity tolls. Moreover, if a metallic wire cable (also called rope) is used to couple the cutting train to a set of counterweights over a corresponding set of pulleys in an attempt to permit the use of a smaller motor, significant additional weight (often 5000 to 8000 pounds or more) may be present.

SUMMARY OF THE INVENTION

According to one aspect of the present invention, an apparatus for moving a cutting tool within a decoking drum is disclosed. The apparatus includes one or more rigid members extending above the decoking drum a sufficient height to permit a range of vertical movement of the cutting tool throughout a substantial majority of the drum. A crosshead drive system is made to facilitate vertical movement of the crosshead may take place relative to the rigid member or members. The crosshead may be made to carry the tool (such as through a fixed or rotatable drill stem or the like), and itself may be raised or lowered within the rigid member by a motorized set of pulleys and belts where the motor and the pulleys are not mounted on the crosshead; in this way, the weight of the vertically-movable components is significantly reduced. Substantially opposing ends of the belts define connection or securing points; thus, one end of each of the belts is secured to the crosshead, while the opposing end is secured to counterweight that can be made to move vertically within or adjacent the rigid member along a travel path that is substantially parallel to the travel direction of the crosshead. In a preferred form the belts and pulleys cooperate such that one or more primary load belts and one or more secondary load belts can be made to travel within corresponding side-by-side channels that are formed in the pulleys; the secondary load belts may be used in the event one or more of the primary load belts suffers a cut or related damage that impairs its ability to raise and lower the crosshead.

According to another aspect of the invention, a decoking assembly is disclosed. The assembly includes a decoking tool configured to receive a cutting fluid from a high pressure fluid source; and an apparatus coupled to the decoking tool for moving it within a decoking drum. The apparatus includes one or more rigid members and crosshead drive system similar to that of the previous aspect.

According to yet another aspect of the invention, a method of operating components within a decoking system is disclosed. The method includes arranging an assembly to be adjacent a decoking drum and using a motorized pulley system that is part of the assembly to selectively raise and lower at least a crosshead and coke cutting tool that may receive a cutting fluid from a high pressure fluid source. As with the previous aspects, numerous non-metallic belts engage each pulley so that rotating the pulley causes movement of the crosshead and a counterweight affixed to opposite ends of each set of belts. As before, at least the motor is statically mounted so that it doesn't have to raise and lower along the crosshead and the coke cutting tool.

BRIEF DESCRIPTION OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
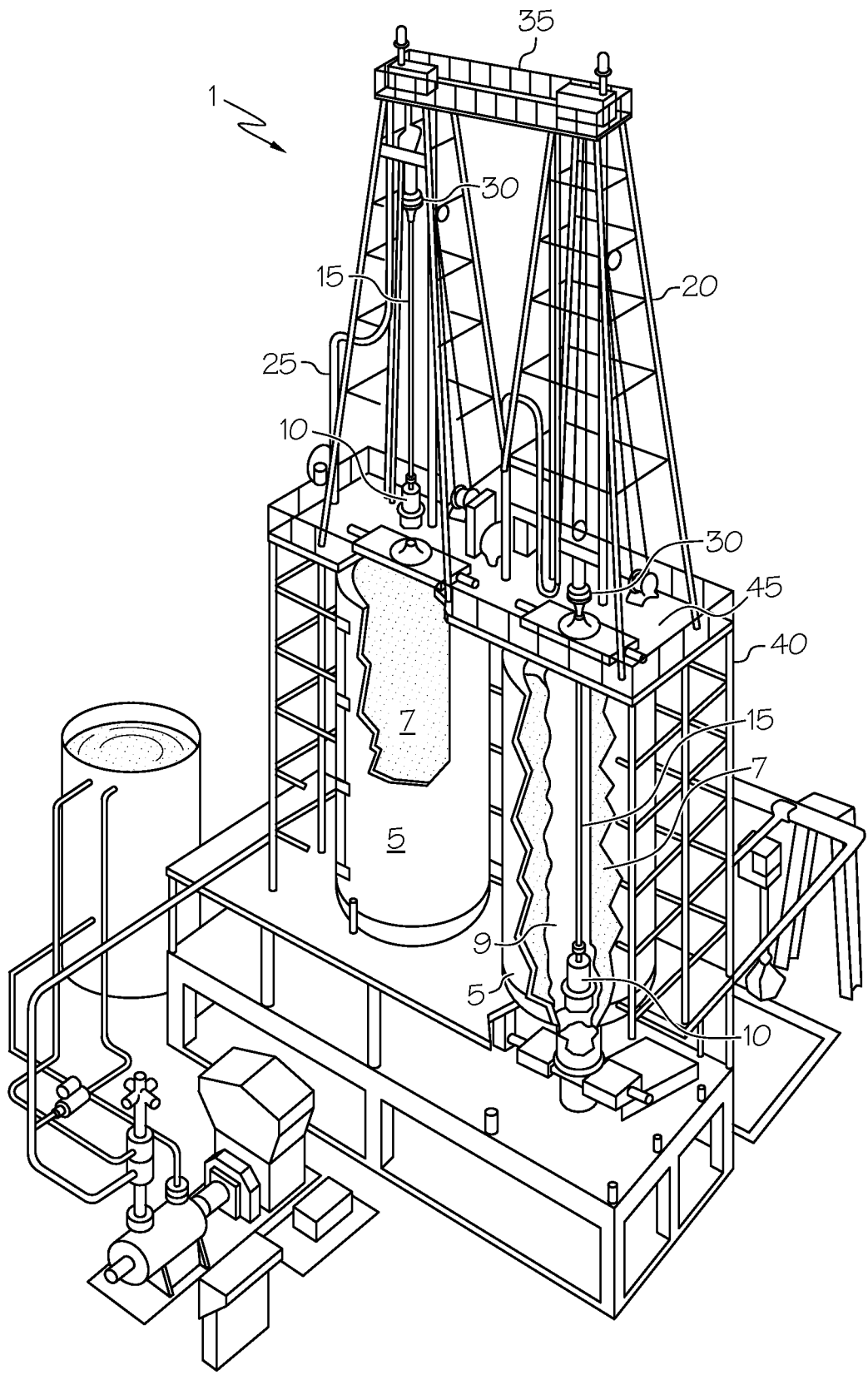
FIG. 1 shows a view of two-drum decoking system which can be retrofitted to use the crosshead drive system of the present invention.

Referring first to FIG. 1, a decoking system 1 includes a pair of coke drums 5, a cutting and boring (also called a decoking) tool 10, a drill stem 15, a pair of towers 20, a flexible water supply hose 25 and a rotary joint 30. The drum 5 on the left shows a partial cutaway that is full of coke 7 that needs to be removed, while the drum 5 on the right shows the decoking tool 10 being lowered through the coke 7 during boring of a pilot hole 9. The decoking tool 10 is mounted at the lower end of the drill stem 15 such that both can move translationally (specifically, vertically) along the length of drum 5. The upper end of drill stem 15 is coupled to the rotary joint in such a way that the decoking tool 10 and drill stem 15 can rotate about a longitudinal axis formed by both. The flexible water supply hose 25 is also coupled to the rotary joint 30 and is used to supply high pressure water to the decoking tool 10. While the decoking tool 10 is mentioned as a single device, it will be appreciated by those skilled in the art that such functions may be separated, as a separate tool that provides boring and a separate tool for cutting may be employed. The construction of the rotary joint 30 is such that it acts as the intermediary between the flexible, yet non-rotational water supply coming from the flexible water supply hose 25 and the rigid, yet rotational drill stem 15 and the decoking tool 10. Each tower 20 acts as a hoist to lift and lower a respective one of the decoking tools 10, drill stems 15, flexible water supply hoses 25 and rotary joints 30.

Drill stem 15 and towers 20 extend vertically above a cage-like support structure 40 that surrounds the drums 5, where in one form the towers 20 may be mounted onto a floor-like upper deck (also referred to as a cutting deck) 45 of the support structure 40. Likewise, the top of the towers 20 and a framework 35 may form a derrick that provides support for the decoking tool 10, drill stem 15, water supply hose 25 and rotary joint 30. As can be seen, the height of each drill stem 15 and its tower 20 is at least as much as the length of the drums 5 to permit drill stem traversal along a substantial entirety of the volume of coke 7 contained therein. As will be discussed in more detail below, the crosshead drive system according to one or more embodiments of the present invention may be placed at or near the top of the tower 20. As mentioned above, the two-tower 20 system of FIG. 1 may also be retrofitted (not presently shown) to use only one horizontally moving tower 20 that can be shuttled back-and-forth between the two drums 5. In such configuration, a single tower 20 may be mounted to a mobile transport in the form of a wheeled carriage that is situated on upper deck 45 of the support structure 40 above the coking drums 5. In one form, the transport may be self-propelled (such as by a motor (not shown)), while in another, it can be guided by a winch or related towing mechanism (not shown) with cables. In a more particular version, the transport may be mounted on rails or tracks that in one form may resemble those used to carry trains. In this way, a single movable decoking tower 20 may be used to operate on multiples drums 5. The crosshead drive system 200 of the present invention can be retrofitted onto existing decoking tool system 1 in order to reduce overall system 1 complexity and redundancy.

Figure 2:
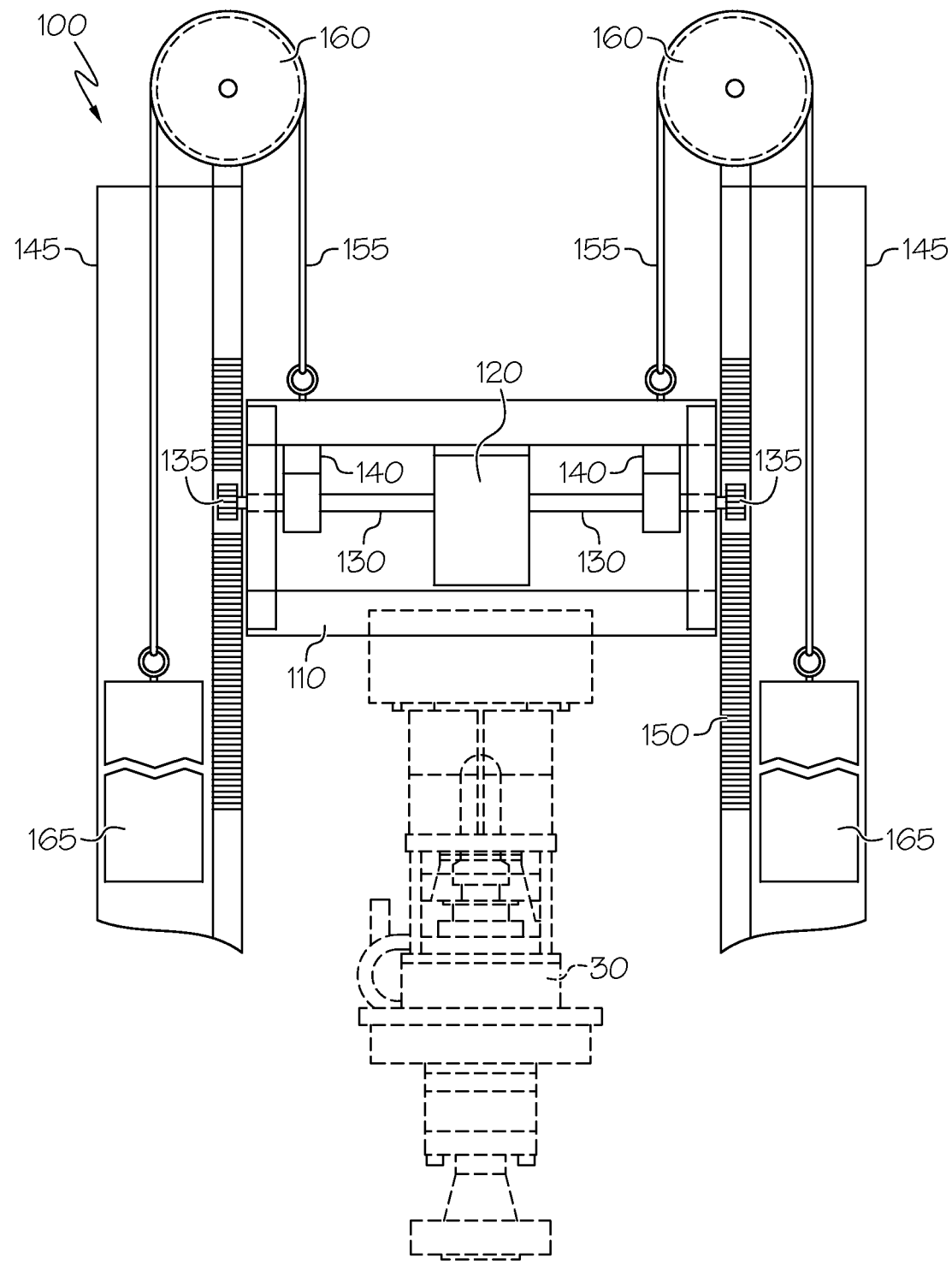
FIG. 2 shows a detailed representation of a crosshead drive system according to the prior art.

Referring next to FIG. 2, a decoking tool carrier with a crosshead drive system 100 according to the prior art is shown. The system 100 includes a self-propelled rigid crosshead 110 rigid with a motor 120 mounted thereon and a reduction gearbox (not shown) having a worm gear (not shown) drivably engaged with the output shaft of the motor 120. The worm gear has output shafts 130, each defining a pinion 135 at its respective end. The output shafts 130 are rotatably supported in bearing blocks 140 to promote secure connection between the pinions 135 and the crosshead 110. The rotary joint 30 is mounted below the crosshead 110 between a pair of vertically-upstanding members 145 that can be used in place of or as part of the tower 20 of FIG. 1. Two vertical toothed racks 150, one secured to each respective vertically-upstanding member 145, cooperate with the pinions 135 such that rotation of the pinions 135 under the influence of motor 120 causes the crosshead 110 to climb or to descend on the toothed racks 150. The pinions 135 are kept in engagement with the racks 150 by means of wheels (not shown) that are mounted on axles (not shown) to bear against the rear surfaces of the racks 150 in a clamping-like relationship. Two cables 155 are attached to the top surface of the crosshead 110 and extend upward over pulleys 160 and thence downward to counterweights 165 which are preferably made to travel within a generally vertical path defined by the construction of the vertically-upstanding members 145 (which in one form may be made from pipes or the like).

Figure 3A:
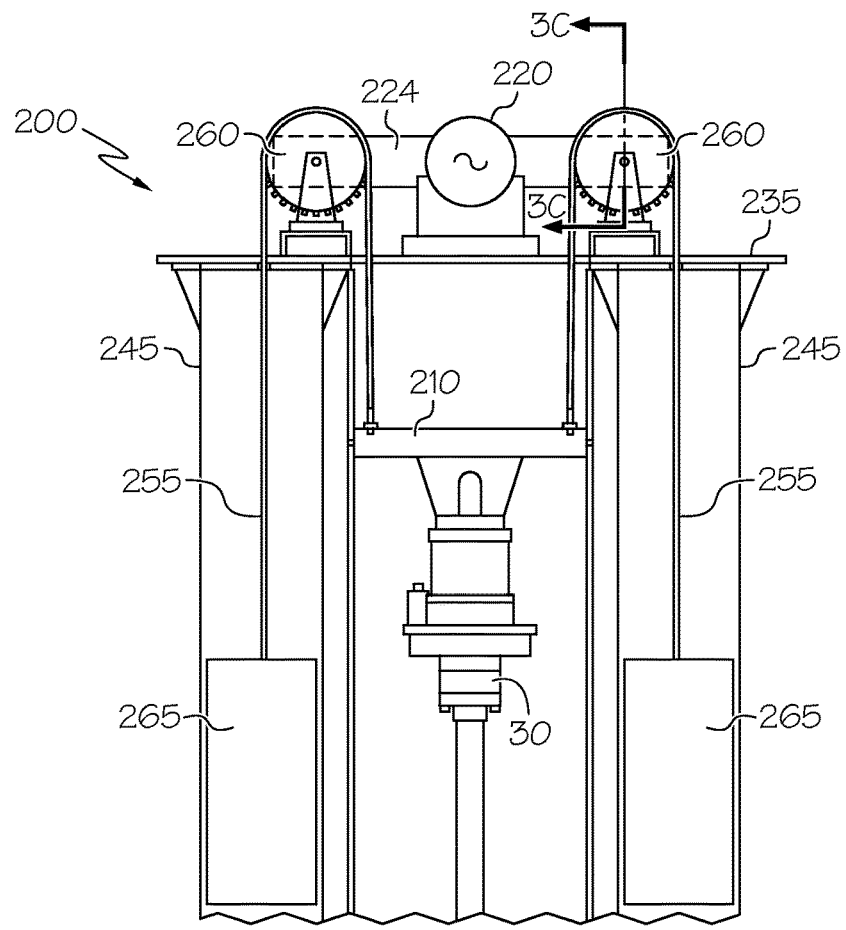
FIGS. 3A through 3D show various detailed views of the crosshead drive system according to one aspect of the present invention.
Figure 3A:
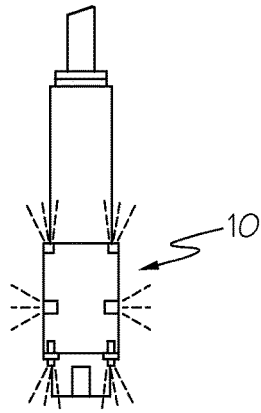
Figure 3B:
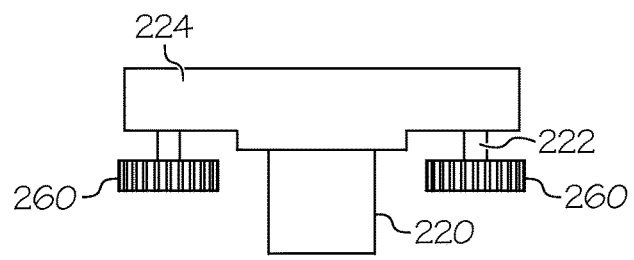

Referring next to FIGS. 3A through 3D and 4A through 4C, the crosshead drive system 200 according to one or more embodiments of the present invention is shown. System 200 includes (among other components, as discussed below) a crosshead 210 and motor 220. In one form, the rotational speed of the motor 220—which may be electrically-powered—may be controlled by a conventional device, such as a variable frequency drive (VFD—not shown). Preferably, the motor 220 and gearbox 224 combination limits the linear raising and lowering speeds of the crosshead 210 to no more than about 41 feet per minute. In addition, the motor 220 can be operated remotely to minimize exposure of an operator to the decoking operation, while in another form, the entire system may be automated. Unlike the self-climbing system 100 of the prior art, motor 220 is statically mounted onto a rigid member deck (such as framework 235 (only the bottom portion of which is shown) that is similar to framework 35 of the towers 20 shown in FIG. 1 that permits a secure mount for the motor 220 (as well as the pulleys that will be discussed in more detail below); this decoupling of the motor 220 from the crosshead 210 means that the crosshead 210 carries less weight, which in turn can permit a less robust rigid member to act as a crosshead 210 support structure. Instead, the crosshead 210 is responsive to movement of belts 255 that are cooperative with the rotation of the output shaft 222 of the motor 220. Referring with particularity to FIG. 3B, in one form, the rotational movement of the output shaft may be imparted through a dual output gearbox 224 to promote equal (but opposite) rotational movement to the belts 255 through pulleys 260 that are mounted onto the framework 235 in a manner generally similar to that of motor 220. The pulleys 260, by virtue of their rotational coupling to the motor 220, impart movement to the belts 255. As before, the rotary joint 30 is mounted below the crosshead 210. Instead of vertical toothed racks 150, pinions 135 and cables 155 of the prior art, the belts 255 driven by pulleys 260 raise or lower the cutting train. The pulleys 260 can be driven by motor 220 and gearbox 224 combination, synchronized motors, or similar apparatus. The belts 255 are secured at one end to the crosshead 210 and to the other end to counterweights 265 that in one form can be made to travel within a generally vertical path defined by the upstanding member 245 portions of the support structure in a manner generally similar to that depicted in FIG. 2. In the present context, the secured nature of the connection may be through any conventional means so long as slippage or inadvertent release is avoided. As such, the belts 255 do not replace the toothed rack 150 of the prior art of FIG. 1, but rather replace the cables 155. Instead, it is the toothed features of the pulley 260 and belt 255 arrangement of the present invention working together that replaces the rack and pinion arrangement of FIG. 1. In FIG. 3B, the pulley 260 is shown in notional form in a single channel width configuration; as will be discussed below in more detail in conjunction with FIGS. 3C, 3D and 4C, the pulley 260 may in fact comprise multiple channels across its width, and may or may not include teeth to help engage complementary-shaped teeth in the belts 255. As such, the motor 220, gearbox 224, belts 255, pulleys 260, counterweights 265 cooperate to define a motorized system that can selectively raise and lower the crosshead 210.

In one form, the motor 220, belts 255, pulleys 260 and counterweights 265 (as well as other components as discussed herein) may define a motorized pulley system that is part of the crosshead drive system 200. Details of augmented forms of engagement between the belts 255 and pulleys 260 is shown with particularity in FIG. 4A, where complementary-shaped teeth 256 and 261 are formed on the belts 255 and pulleys 260, respectively in order to facilitate a meshed cooperation between them upon pulley 260 rotation. Furthermore, although the crosshead 210 and its ancillary equipment are shown in FIG. 3A as being situated between two upstanding member 245 portions of the support structure that acts as the towers 20 of FIG. 1, it will be appreciated by those skilled in the art that it may also be supported by a single tower or derrick in order to facilitate an even more lightweight (and moveable) structure that can be shuttled back-and-forth between adjacent decoking drums. In one such form, such a single-tower structure may be moved by rollers, wheels or the like across a planar surface (such as upper deck 45 of the decoking system 1 of FIG. 1); either embodiment is deemed to be within the scope of the present invention.

Figure 3C:
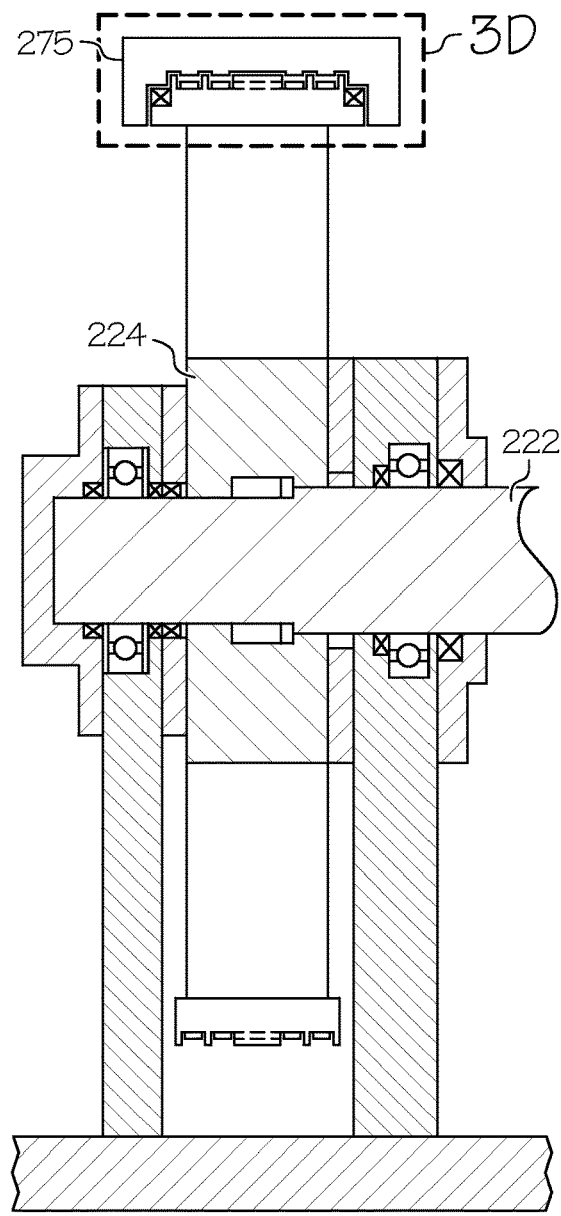
Figure 3D:
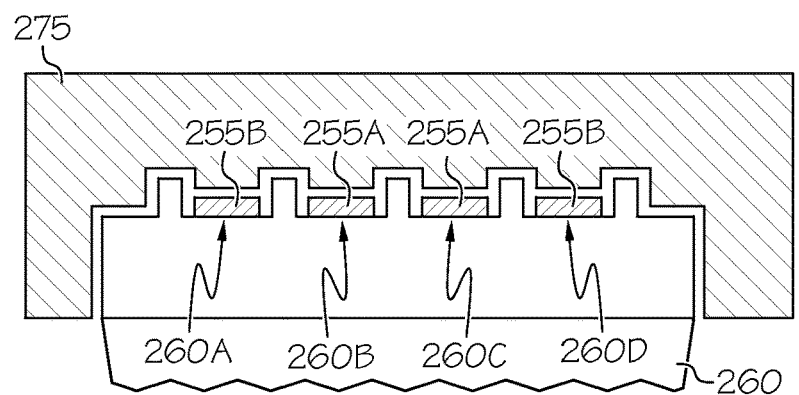
Figure 4A:
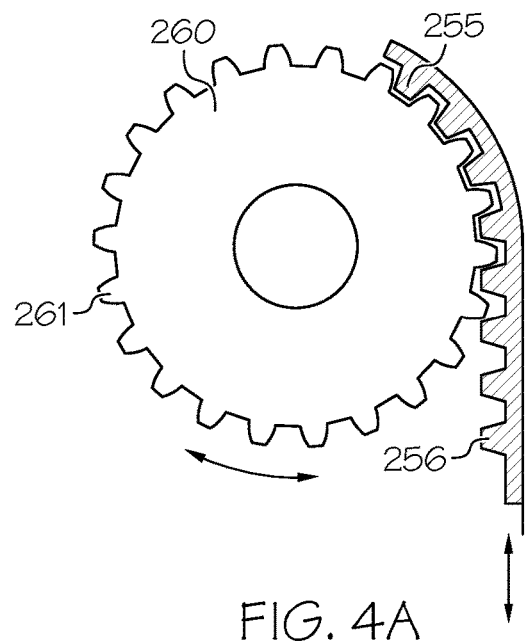
FIGS. 4A through 4C show a simplified view of the cooperation of a belt and pulley according to one aspect of the present invention.
Figure 4B:
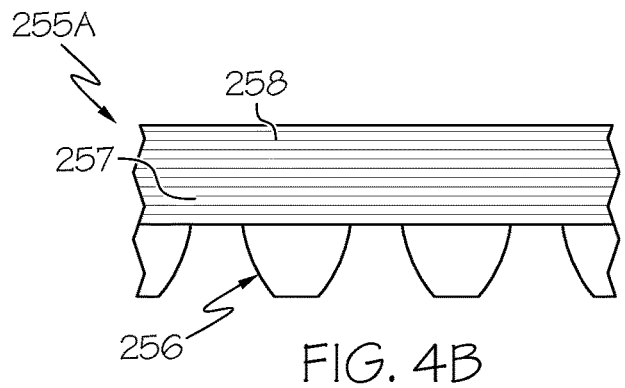
Figure 4C:
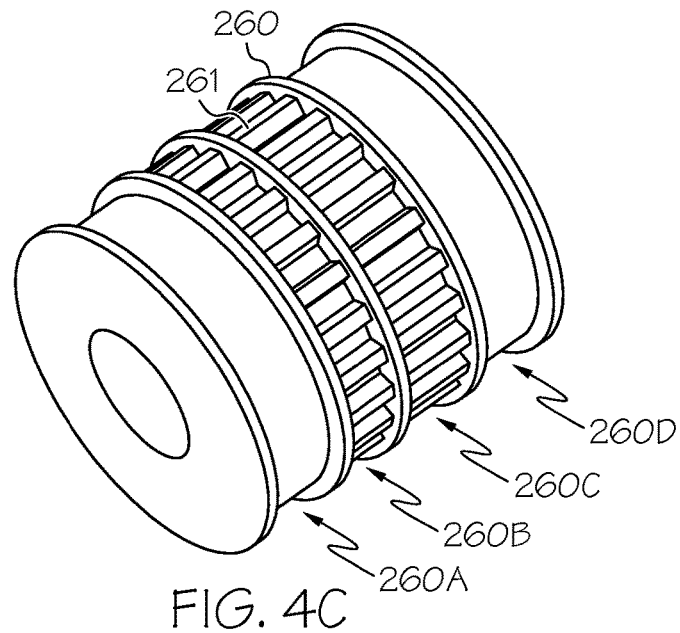

Referring with particularity to FIGS. 3C and 3D (both of which show a cutaway view along Section A-A of FIG. 3A of one of the pulleys 260 to highlight how multiple channels may define the engagement region of the pulley 260 and belt 255) as well as FIG. 4C, in one embodiment, the use of pulley 260 may be configured to include teeth 261 in one or more of the channels 260A through 260D (as shown with particularity channels 260B and 260C). As will be appreciated by those skilled in the art, the number of such teeth 261 may be varied according to the needs of system 200, taking into appropriate consideration overall system 200 weight, cost, fail-safe needs or the like, and that all such variants (i.e., with or without teeth 261 formed in some or all of the channels 260A through 260D) are deemed to be within the scope of the present invention. Likewise, even though four channels 260A through 260D are shown in FIGS. 3C, 3D and 4C, the number of such channels may be greater or fewer, depending on the need; as with the use of teeth 261, all such variants in the number of channels are deemed to be within the scope of the present invention.

In the embodiment depicted in FIGS. 3C and 3D, two central channels 260B, 260C are sized and shaped to cooperate with drive belts 255A that function as primary load belts, while two outer channels 260A, 260D accept fail-safe (also referred to as secondary load) belts 255B that do not carry a load during normal operation, but can do so upon failure of one of the primary load belts 255A. As discussed above, the pulley 260 embodiment of FIG. 4C has two of the channels 260B and 260C configured to accept the drive belts 255A (and are also shown possessing teeth 261), while channels 260A and 260D (presently shown without teeth) are configured to engage the fail-safe belt 255B; it will be appreciated that any combination of drive belts 255A and fail-safe belts 255B—as well as a corresponding number of channels to engage them, and whether such channels are outfitted with teeth 261—is also deemed to be within the scope of the present invention. The combination of at least one primary load belt 255A and at least one secondary load belt 255B that together engages one of the pulleys 260 is referred to herein as a belt set (or more simply, set). As shown with particularity, the size and number of pulley channels 260A through 260D, as well as the number and size of both drive belts 255A and fail-safe belts 255B that as a set cooperate with such channels, may be varied according to the needs of the particular crosshead drive system 200.

Both the drive belts 255A and the fail-safe belts 255B can be made from the same materials, while in another configuration, they can be made from different materials, depending on the end-use application and related design requirements. For example, the drive belts 255A may include continuous fiber reinforcement to provide additional load-carrying capability. Referring with particularity to FIG. 4B, details of one embodiment of the drive (i.e., primary load) belt 255A construction is shown. In particular, drive belt 255A includes elongated, axially extending structural fibers 257 embedded in a flexible matrix or support 258. In one form, the material making up the fibers 257 imparts a high tensile strength and low stretching/elongation to the drive belt 255A; such material may be a carbon fiber-based material such as that found in U.S. Pat. No. 5,807,194 entitled TOOTHED BELT the entirety of which is incorporated by reference herein. Likewise, the material making up the flexible support 258 can be a rubber- or synthetic-based material, such as polyurethane or the like. Additional materials (not shown) may be used to improve environmental resistance, handling, frictional resistance or the like. In a preferred form, the fibers 257 are continuous and extend for a substantial entirety of the length of the drive belt 255A as it extends from the counterweight 265 to the crosshead 210. In a likewise preferred form, the cross-sectional profile of the drive belts 255A is generally rectangular with the longer of its two lateral dimensions sized to fit within a comparable channel 260B, 260C or the like of pulley 260. Although the fibers 257 are presently shown as only being present in the base (i.e., flat) portion of the support 258 of drive belt 255A, they may also be present in the portion that corresponds to the teeth 256, and in such case may be made of discontinuous (i.e., chopped) fiber reinforcements. In another variant (not shown), the fibers 257 are present throughout a partial depth of the base portion of the support 258 of drive belt 255A, while the teeth may or may not include additional reinforcement.

In one non-limiting form, the profile of teeth 256 of the belt 255 (whether in the form of the primary load belt 255A or the secondary load belt 255B) can be generally trapezoidal in shape (including curvilinear variants) with a belt thickness, tooth height and tooth-to-tooth spacing suitable for the belt operational environment. In one non-limiting configuration suitable for use with the pulleys 260 that may be used with decoking system 1, the primary load belt 255A may include a roughly 0.55 inch spacing between adjacent teeth that are about 0.25 inch tall as part of a belt maximum thickness of about 0.40 inch. The teeth 261 of the companion pulley 260 may be similarly shaped and sized to promote secure engagement between them during belt-to-pulley meshing. The speed of the drive system is such that it imparts a relatively low rotational speed to the pulley 260; in one form, such speed is no more than about 10 revolutions per minute (rpm) for a pulley 260 with a diameter of between about 24 and about 36 inches. Likewise, the width of each channel 260A, 260B, 260C or 260D may be between about 1.5 and 2 inches. By using the non-metallic belts 255 of the present invention, the inventor believes that between about 2,000 and 4,000 pounds may be reduced from a 15,000 pound cutting train of the decoking system 1. Furthermore, this permits removal of winches and secondary safety equipment (the latter of which often requires extensive periodic maintenance) to further simplify the system 1.

By way of the four-channel variants shown in FIGS. 3C, 3D and 4C, two of the belts 255 may be of the primary load belt 255A variety; each would include substantially continuous carbon fiber reinforcement along the belt longitudinal axis; as discussed above, these belts 255A will include teeth 256. Thus, each four-channel pulley 260 would include two of these primary load belts 255A to engage the corresponding teeth 261 to transfer the forces due to the cutting train load. The remaining two of belts 255 would be the secondary load belt 255B that could define a flat or rectangular cross-sectional profile with no teeth. This belt 255B, as well as the corresponding channel 260D, will remain as part of the fail-safe operation in the event one of the primary load belts 255A fail. Various material choices, dictated by cost, ease of manufacture, load-bearing abilities or the like, may be used; such materials may include engineered plastics (such as with Dyneema® or related ultra high molecular weight polyethylene fibers).

The system fail-safe characteristic may be achieved in different ways. For example, a sensor-based device (not shown) as part of a condition monitoring system may be included to continually monitor belt 255 tension to look for evidence of wear; such a device may be coupled to a processor-based controller (not shown) that includes a comparitor, algorithm or other means for determining when belt 255 replacement is necessary. In a related way, the condition of the driving belts 255A can potentially be monitored using optical methods coupled with image processing algorithms that are cooperative with such a controller. In a more particular form, once one of the belts 255 is determined to be in need of replacement, it can be done while leaving the others in place. In another form, the fail-safe operation may be achieved by having one or more secondary belts 255B configured to engage the pulley 260 in such a way that the corresponding one or more of the channels 260A-260D of the pulley 260 are devoid of teeth or other belt-engaging enhancements, thereby making the cooperation between them based solely on frictional contact between their contacting surfaces. In other words, because the weight of the system 200 is always counterbalanced, the secondary load belts 255B only need to overcome inertia loads, making manipulation of the system 200 into a more favorable belt-replacement location simpler. In this configuration, the secondary load belt 255B remains substantially unloaded, over a flat pulley without carrying any load during normal raising and lowering operations of the system 200, decoking tool 10 and rotary joint 30, but capable of holding the full load in its present position if the primary load belt part of system 200 breaks. In such circumstance, a new primary load belt 255A may replace the one that failed, while the secondary belt 255B is robust enough to permit some movement of the system 200 to a more convenient position to change the effected belts.

The secondary load belt 255B (which is shown in cross-sectional profile in FIG. 3D) is preferably made from an engineered plastic material (such as Dyneema® as mentioned above) in order to impart to it enhanced mechanical (for example, strength) properties. Such engineered plastic may include a blend of various materials, including continuous or discontinuous fiber reinforcement; in the former configuration, secondary load belt 255B may generally resemble the primary load belt 255A with its toothed features, although perhaps with a lighter fiber loading. In yet another form, such engineered materials may include those with very small (i.e., nanotechnology-sized, for example, below about 10 nanometers in diameter) particles or related reinforcement materials. Likewise, in another form, these fail-safe secondary belts 255B may be of similar construction as that of primary load belts 255A, or may be made of a simpler construction, such as by not including any fiber reinforcement, maintaining a strictly flat (i.e., rectangular cross-sectional profile) shape, or the like.

Referring again with particularity to FIG. 4C in conjunction with FIG. 4B, in one form, pulley 260 includes two side-by-side channels 260B and 260C. Each belt 255 is about 1.75 inches wide; with teeth, each two-channel pulley 260 may carry up to about 15,000 pounds of load (making the total rating for a two-pulley system about 30,000 pounds for a safety factor of about two for a notional 15,000 pound cutting train). Thus, if two of the four belts 255 are operational, an ongoing cutting operation may be completed before changing the belts. Even in situations where the two belts 255 that fail are on the same pulley 260, the secondary load belt 255B will still keep the crosshead 210 leveled to move it into a position where the broken belt can be replaced, as the actual load across the system 200 remains substantially weight-balanced. In another form, pulley 260 includes four side-by-side channels 260A, 260B, 260C and 260D. Thus, if the six of the belts 255 (of a total of eight belts for a two-pulley system) fail, the previously-dormant flat secondary belt 255B will engage and hold the load. In such case, it may be necessary to use a separate portable winch to slowly bring the crosshead 210 up to where repair personnel can access it to connect one new belt 255 in each pulley 260. The gearbox 224 may be equipped with a worm gear to avoid rotation with the force coming from the weight-driven side. Using the exemplary form of FIG. 4C, if all three of the primary load belts 255A in one side of the crosshead 210 are cut, the fail-safe secondary load belt 255B is strong enough to hold the load and consequently keep the crosshead 210 leveled; this in turn allows the other three still-functioning primary load belts 255A on the opposite side of the crosshead 210 to continue to move the crosshead 210 up and down. Likewise, if subsequently these other three drive belts in the other side collapse, the fail-safe secondary load belt 255B on that side will also hold the load in place. At this point, a service technician has a few repair options. First, some of the primary load belts 255A may be replaced; as mentioned above, the load-bearing capacity of the secondary load belts 255B along with the counterweight-based design of the system 200 permits the system 200 to be move to a position at which the broken primary load belts 255A may be replaced. Another option is to lift or lower the (still balanced) cutting train with temporary ropes until the crosshead 210 gets to a point in which the broken primary load belts 255A can be changed easily.

An additional cover 275 may be placed over the top of the pulleys 260 in order to keep debris from collecting on them or belts 255. Such cover 275 may also include an optically-transparent inspection window to allow quick visual assessment of the belts 255. Cover 275 may also include cutouts defined in its lower surface that are shaped to complement that of the radially-outward edge of pulley 260 in order to keep the belts 255 from jumping out of the channels 260A through 260D; this can be seen with particularity in FIG. 3D. Even though the cover 275 is particularly well-suited for configurations where the pulley 260 is toothed, it also works with the other versions discussed herein as well.

Figure 5:
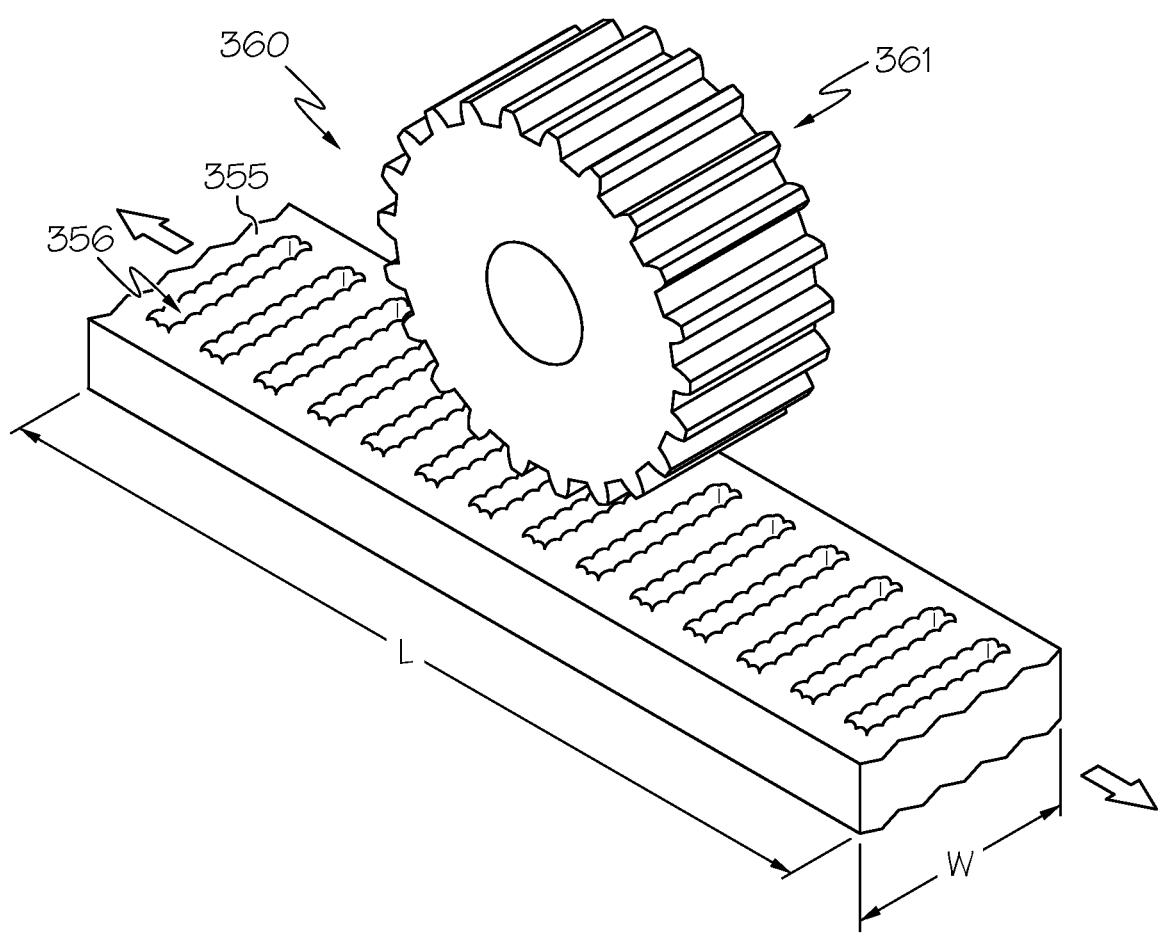
FIG. 5 shows a notional configuration of a toothed pulley and a complementary-shaped belt according to another aspect of the present invention.

Referring next to FIG. 5, an alternate configuration for a toothed version of the pulley 260 and belt 255 of FIG. 4A is shown in an inverted form for clarity of view. In actual use, the drive belt 355 would be situated above the pulley 360 such that instead of teeth (such as teeth 256 of the belts 255, 255A of FIGS. 4A and 4B), it includes cutouts 356 formed therein that would engage the teeth 361 of the pulley 360 near the top in order to permit the belt 355 to fulfill its weight-bearing function for the crosshead 210 and ancillary equipment. In a manner similar to pulley 260 with teeth 261, belt 355—which while continuing to define a generally rectangular cross-sectional profile—now includes numerous apertures or cutouts 356 that are of a generally oval or rectangular shape with the prolate axis oriented widthwise (i.e., across the width W) on belt 355. The size of the cutouts 356 formed along the length L is such that their dimensions could be generally similar to that of the teeth 361 that are formed on pulley 360, depending of the nature of the engineered material (an example of which is Dyneema®, carbon fiber or the like) that is used for the belt 355. In one form, these cutouts 356 may be lined with an additional wear resistant fabric-reinforcement, to achieve better edge distribution of the load. As such, of the two types of belts discussed herein (i.e., the load-bearing primary or drive belts and the secondary fail-safe belts), the first preferably include teeth or cutouts such that they can be used with toothed pulleys, while the second preferably defines a rectangular cross section without teeth or holes such that these latter belts act as a sling.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, for the purposes of describing and defining the present invention it is noted that the term "substantial" (and its variants) is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. An apparatus for moving a coke cutting tool within a decoking drum, said apparatus comprising:
   a rigid member configured to be coupled to a support structure such that said rigid member extend a sufficient height above said decoking drum to permit a range of vertical movement of said coke cutting tool substantially therethrough; and
   a motorized system configured to selectively raise and lower said coke cutting tool, said motorized system comprising:
      a crosshead defining a connection to said coke cutting tool and movably cooperative with said rigid member;
      a plurality of pulleys secured to said rigid member, each configured to rotate about an axis;
      a plurality of non-metallic belts each of which is secured at one end to said crosshead and rotationally cooperative with a respective one of said plurality of pulleys to move therewith;
      at least one counterweight secured to an opposing end of a respective one of said plurality of non-metallic belts; and
      at least one motor statically mounted to said rigid member, said at least one motor configured to impart rotational movement to said plurality of pulleys such that said plurality of non-metallic belts selectively raise or lower said crosshead relative to said rigid member.

2. The apparatus of claim 1, wherein said plurality of pulleys consists of two pulleys each configured to rotate in a direction opposite of one another.

3. The apparatus of claim 1, wherein each of said plurality of pulleys defines a plurality of side-by-side channels each of which is sized to accept a corresponding one of said plurality of non-metallic belts therein.

4. The apparatus of claim 3, wherein at least one of said plurality of side-by-side channels and corresponding ones of said plurality of non-metallic belts define a plurality of protruding teeth to promote an enhancement to said cooperative rotational movement.

5. The apparatus of claim 4, wherein said at least one of said plurality of side-by-side channels defines a plurality of protruding teeth and corresponding ones of said plurality of non-metallic belts defines a plurality of protruding teeth such that upon rotational movement of said corresponding ones of said plurality of non-metallic belts around said respective one of said plurality of pulleys, said plurality of channel protruding teeth and said plurality of belt protruding teeth mesh with one another.

6. The apparatus of claim 4, wherein said at least one of said plurality of side-by-side channels defines a plurality of protruding teeth and corresponding ones of said plurality of non-metallic belts defines a plurality of apertures each of which are sized to accept a corresponding one of said plurality protruding of teeth.

7. The apparatus of claim 6, wherein said plurality of apertures are reinforced.

8. The apparatus of claim 7, wherein said plurality of reinforced apertures are fabric-reinforced.

9. The apparatus of claim 3, wherein each of said plurality of non-metallic belts that cooperate with a corresponding one of said respective one of said plurality of pulleys comprise at least one primary load belt and at least one secondary load belt.

10. The apparatus of claim 9, wherein more of said plurality of side-by-side channels within said respective one of said plurality of pulleys engage said at least one primary load belt than said at least one secondary load belt.

11. The apparatus of claim 9, wherein at least one of said at least one primary load belt and said at least one secondary load belt comprises substantially continuous reinforcing fibers embedded therein.

12. The apparatus of claim 9, wherein said at least one primary load belt and a respective one of said side-by-side channels within said respective one of said plurality of pulleys define a plurality of protruding teeth to promote an enhancement to said cooperative rotational movement.

13. The apparatus of claim 1, wherein at least one of said plurality of non-metallic belts comprises a carbon fiber reinforcement.

14. The apparatus of claim 13, wherein said carbon fiber reinforcement comprises a substantially continuous reinforcement along the dimension of said at least one of said plurality of non-metallic belts that is substantially coincident with tensile forces imparted thereto by said crosshead and said counterweight.

* * * * *